United States Patent Office 3,318,214
Patented May 9, 1967

3,318,214
PHOTOGRAPHIC CAMERA
Franz Singer and Helmut Müller, Munich, and Johann Isztl, Karlsfeld, near Munich, Germany, assignors to Compur-Werk Gesellschaft mit beschrankter Haftung & Co., Munich, Germany, a firm of Germany
Filed May 26, 1964, Ser. No. 370,322
Claims priority, application Germany, May 30, 1963, C 30,078
13 Claims. (Cl. 95—10)

This invention relates to a photographic camera, and more particularly to the shutter of the camera and to the manner in which the shutter mechanism is interconnected with and controlled by certain parts of the camera.

An object of the invention is the provision of a generally improved and more satisfactory photographic camera.

Another object is the provision of a generally improved and more satisfactory shutter useful in connection with various kinds of cameras.

Still another object is the provision of a photographic shutter so designed and constructed that it may be used optionally to make what are sometimes called "programmed" exposures, and also may be used if desired to make "automatic" exposures, and again may be used as a manually set shutter.

A further object is the provision of such a shutter so designed that it can be set quickly and with a minimum of effort, to any of the kinds of operation desired, that is, manual operation, automatic operation, and programmed operation.

A still further object is the provision of a shutter so designed and constructed as to prevent the taking of a photograph when the setting members are in a wrong position.

Another object is the provision of a shutter in which the diaphragm aperture is set through the action of a transmission member of particularly simple and effective form, operative to transmit motion from various other moving members to the diaphragm in various ways, depending upon the kind of exposure desired.

These and other desirable objects may be attained in the manner disclosed as an illustrative embodiment of the invention in the following description and in the accompanying drawings forming a part hereof, in which:

According to the present invention, the camera itself, shown in general at 10, is of a construction which is in general known per se, except for the special features herein disclosed. The front wall 10a of the camera body or housing carries an objective shutter, the main part of the casing or housing of which is shown in general and somewhat schematically at 12. In the conventional annular space 12a (FIG. 5) such as is customarily found in objective shutters, there is the usual conventional blade operating mechanism for operating the conventional shutter blades 14 through their usual pivoted opening and closing movements. Secured within the housing 12 is the part 12b having at its rear end an outwardly extending radial flange constituting the mounting plate for mounting the operating mechanism within the annular space 12a, and having a forwardly extending tubular flange constituting the front tube of the shutter, surrounding the light aperture through which the optical axis extends. The front lens mount 16 is screw threaded into this front tube for focusing movement forwardly and rearwardly therein, in conventional manner, by rotation of the lens mount. The focusing lens mount 16 has a focus distance scale marked peripherally on it, graduated in suitable units of distance such as feet or meters, as shown in FIG. 2, the scale being read in the conventional way in connection with a fixed reference mark.

Figures 3, 4, 5:
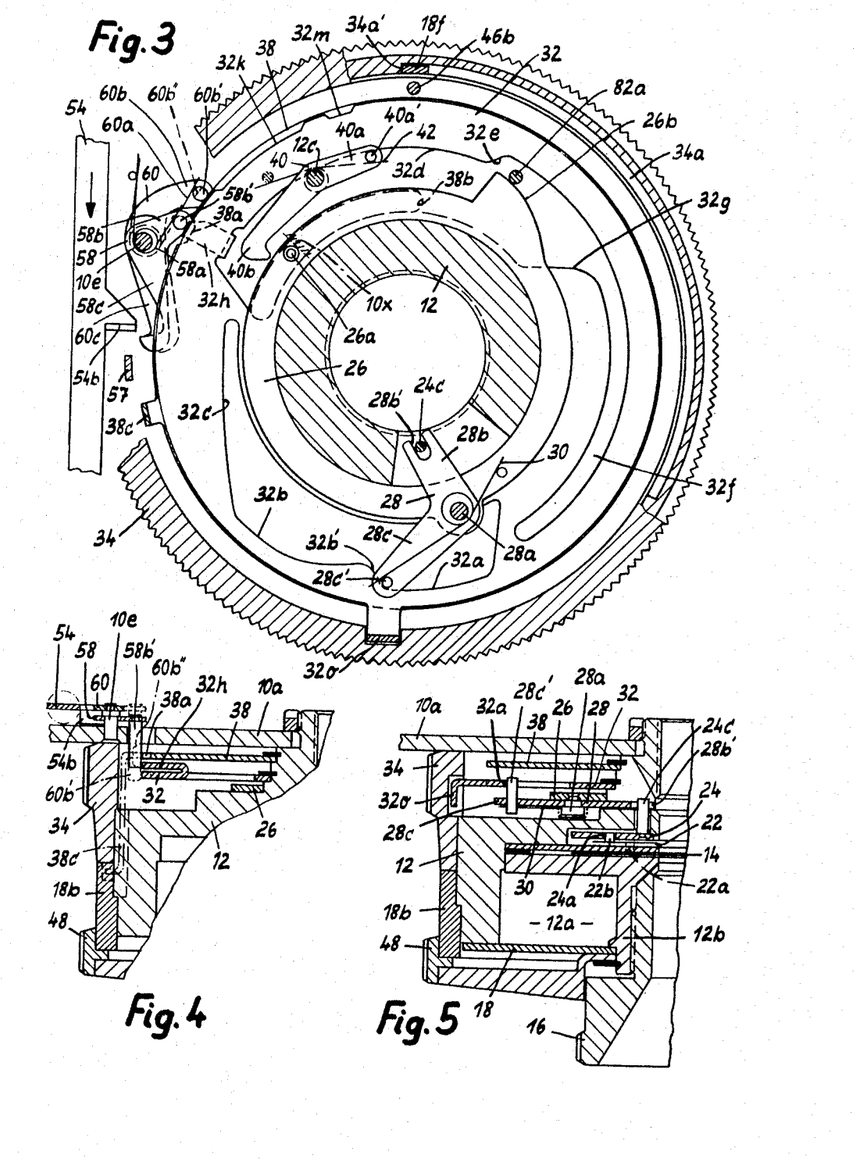
FIG. 3 is a transverse section through the shutter and certain associated parts of the camera.
FIG. 4 is a fragmentary radial section through one part of the shutter.
FIG. 5 is a fragmentary radial section through another part of the shutter.
Figures 6, 8:
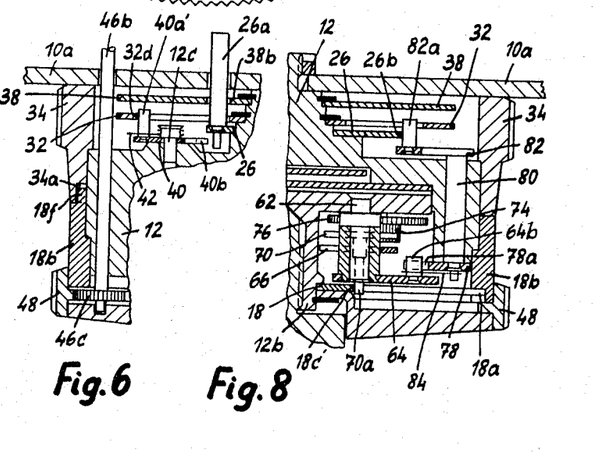
FIG. 6 is a fragmentary radial section through still another part of the shutter.
FIG. 8 is a fragmentary radial section through part of the mechanism shown in FIG. 7 and associated parts.
Figure 7:
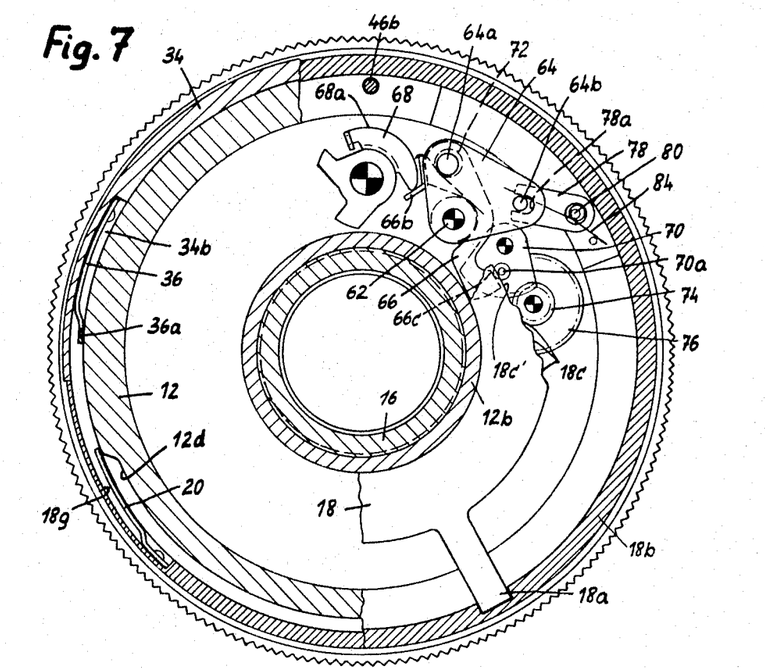
FIG. 7 is a transverse section through the shutter on the section line different from that of FIG. 3.

For setting the shutter speed or duration of the exposure, there is an internal control ring 18 which, as conventional in objective shutters, rotates about the optical axis of the shutter as a center and has a bearing on a shoulder on the front tube 12b of the shutter, as seen in FIGS. 5 and 8. This internal speed control ring 18 has an arm 18a engaging an internal notch in the external speed control or speed setting ring 18b so as to couple the two rings together for joint rotation. The external ring 18b rotates on the exterior of the shutter casing 12, about the optical axis as a center. The internal ring 18 is provided with a cam portion for engaging the shutter retarding or delay mechanism to control the duration of the exposure, the cam portion in this instance being a stepped cam having a plurality of steps as indicated in FIG. 7 at 18c, the first or lowest of the steps being somewhat elongated circumferentially as compared with the others, and being identified by the numeral 18c'. The cam surface engages and controls the position of a pin 70a on the primary member 70 of the retarding or delay mechanism, as will be further described below.

Figure 2:
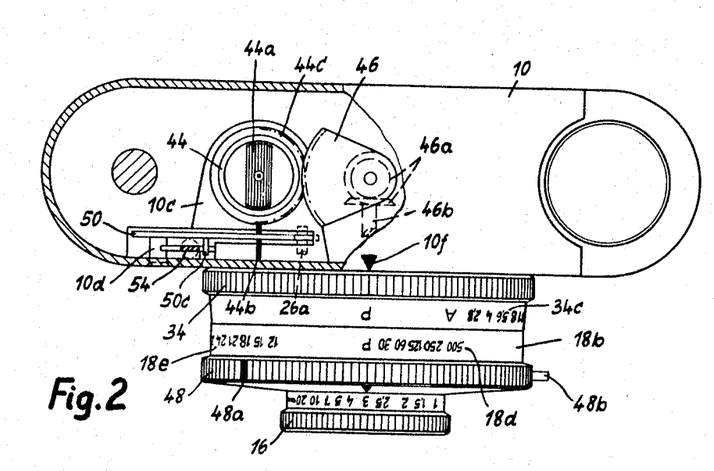
FIG. 2 is a top plan of the camera, again with parts broken away to show certain interior parts, and with certain parts shown schematically.

Marked circumferentially on the external periphery of the setting ring 18b is a shutter speed or time scale 18d, seen in FIG. 2. Various graduations may be used, the usual conventional graduations being expressed in fractions of a second, the numerals being understood conventionally to represent the denominators of a fraction whose numerator is one so that, for example, the graduation "30" means ⅟₃₀ of a second. The graduations cover the desired speed range of the shutter, those illustrated in FIG. 2 gonig from 30 to 500. Next beyond the graduation 30 at one end of the scale is the reference mark P. Depending upon the desired operation of the shutter, either the reference P or one or another of the graduations of the shutter speed scale, is brought opposite the fixed reference mark 10f on the body of the camera, as will be further explained below.

The periphery of the setting ring 18b also bears a circumferentially extending film sensitivity scale 18e graduated in any desired graduations, those illustrated in FIG. 2 being according to the European system of graduations, known as the DIN system. These are read in conjunction wtih a reference mark 48a on a film sensitivity ring 48, as further mentioned below.

Referring to FIG. 7, a leaf spring 20 is located in a circumferentially extending recess 18g in the inner face of the ring 18b and is riveted or otherwise fastened at one end to the ring 18b, the other or free end of the spring 20 extending in a generally circumferential direction from the fastened end. The inherent springiness or resiliency of the spring 20 tends to move the free end inwardly toward the center of rotation, keeping the free end pressed against the stationary shutter part 12.

The shutter also includes an iris diaphragm having the usual conventional diaphragm leaves located as usual in an annular space behind the shutter blades. For the sake of simplicity and clarity, only one of the diaphragm leaves 22 is illustrated in FIG. 5. The mounting pin 22a of this leaf is rotatable in a fixed part of the shutter housing, while the operating pin 22b of the leaf engages in one of the usual conventional series of control slots 24a in a diaphragm control ring 24 which is rotatable about the optical axis as a center.

A setting ring 26 rotatably mounted on the rear wall of the shutter housing 12 (see especially FIGS. 3, 6, and 8) and has an axially projecting pin 26a (FIGS. 3 and 6), and also a cam-like control surface 26b (FIGS. 3 and 8) which cooperates with a setting pin 82a which is part of the shutter delay mechanism or retarding mechanism, as will be further explained below. A double armed transmission lever 28 (FIGS. 3 and 5) somewhat in the shape of a bellcrank, is rotatably mounted on a pin 28a secured to the setting ring 26. An orienting spring 30 urges the transmission lever in a counterclockwise direction. One arm 28b of this lever has a fork 28b' which engages a control pin 24c rigidly connected to the diaphragm control ring 24. In the other arm 28c of the transmission lever there is a transmission pin 28c' which engages a control cam on a switch ring 32 (FIGS. 3–6 and 8) which is rotatable about the optical axis as a center. This control cam has several parts, as best seen in FIG. 3, one part (with which the pin 28c' is engaged in this view) being shown at 32a, another at 32b, and a third at 32c, with a sharp rise or transition cam portion 32b' between the parts 32a and 32b. In addition to the cams just mentioned, the switch ring 32 also has an arcuate control edge 32d (see FIG. 3), a switch cam portion or oblique portion 32e, an arcuate slot 32f, another switch cam 32g, and a rearwardly bent lug 32h. The periphery of the switch ring 32 also has recesses 32k and 32m.

Figure 9:
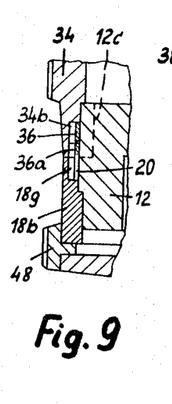
FIG. 9 is a fragmentary radial section through a different part of the shutter.

By means of a coupling arm 32o on the ring 32, extending radially and then forwardly (FIG. 5) into a notch in the inner face of the ring 34, the switch ring 32 is coupled for conjoint rotation with the manual setting ring 34 rotatably mounted on the periphery of the shutter housing 12 rearwardly of and concentric with the ring 18b. The inner face of the ring 34 has a circumferential recess 34a (FIGS. 3, 6, and 9) one end 34a' of which serves as an abutment for engaging a lug or projection 18f on the ring 18b to limit relative rotation of the two rings 34 and 18b in one direction. The ring 34 also has a second internal recess 34b (FIGS. 7 and 9) which accommodates a leaf spring 36, fastened firmly at one end to the ring 34. The resilience or springiness of the leaf spring 36 tends to move the other or free end of the spring radially inwardly toward the optical axis, keeping it in engagement with the stationary shutter housing member 12 so that a tooth 36a on this free end of the spring 36 may engage the free end of the other leaf spring 20 under certain circumstances as further described below.

On the periphery of the ring 34 there are certain markings as shown in FIG. 2, including the index mark P (standing for "program") and the index mark A (standing for "automatic") and a diaphragm aperture scale 34c graduated in the usual conventional f numbers. The various markings on the periphery of the ring 34, like those on the periphery of the ring 18b, are all read in connection with a stationary index mark 10f on the camera body, as will be readily understood from FIG. 2.

A locking ring 38 (FIGS. 3–6) is rotatably mounted behind the switch ring 32, on a bearing shoulder near the rear of the shutter housing member 12, for rotation about the optical axis as a center. This locking ring 38 has a recess 38a (FIGS. 3 and 4) in its periphery, and a circumferential slot 38b for passage of the pin 26a, and a lateral forwardly projecting arm 38c (FIG. 4) the forward end of which is bent outwardly to engage in a notch in the control ring 18b so that the locking ring 38 is thus coupled to the ring 18b and is turned by and as a result of any turning motion imparted to the ring 18b.

Referring now to FIGS. 3 and 6, there is a stationary pivot pin 12c fixed to the main shutter housing member 12. Pivotally mounted on this pin 12c is a double armed locking lever 40, located to the rear of the main radial shoulder on the housing member 12, between it and the wall 10a of the camera, and in the annular space between the ring 34 and the rearward tubular portion of the housing. A spring 42 biases the locking lever 40 in a counterclockwise direction when viewed from the front as in FIG. 3, so as to urge the pin 40a' on one arm 40a of the locking lever, against the control edge 32d of the switch ring 32. The other arm 40b of the locking lever is formed as a hook and cooperates with the pin 26a on the setting ring 26, in a manner explained in more detail below, to prevent turning of the setting ring when the exposure is to be controlled entirely manually.

Figure 1:
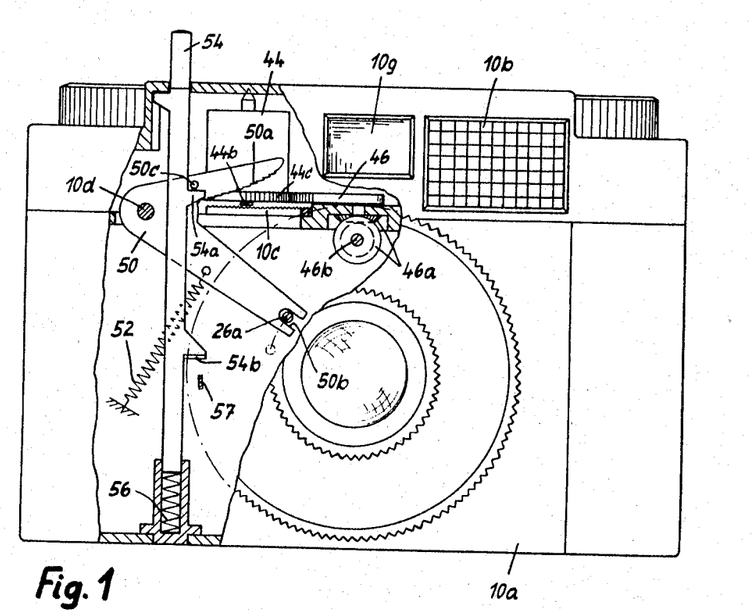
FIG. 1 is a front elevation of a camera in accordance with a preferred embodiment of the invention, with parts broken away in order to show certain interior parts, and with certain parts shown schematically.

A photoelectric exposure meter of known form is built into the camera body 10, the photocell of the meter being disposed behind the window 10b (FIG. 1). The movable coil 44a of the exposure meter, electrically connected to the photocell in the usual conventional manner, is rotatably mounted within the meter housing or casing 44. The coil is connected to an indicating element or pointer 44b which swings as the coil turns, moving over a stationary clamping jaw member 10c on the camera body. The entire meter housing or casing 44 is also mounted in the camera body for rotation concentrically with the axis of rotation of the coil 44a within the housing 44. For the purpose of rotating the meter housing, to feed into the system the factor of film sensitivity, the housing 44 is provided with a segment 44c having gear teeth which engage or mesh with gear teeth on a toothed segment 46 operatively connected to one of two meshing bevel gears 46a, the other of which is connected to a shaft 46b which extends forwardly parallel to the optical axis, as best seen in FIGS. 1, 2, and 6. Fixed to the shaft 46b near the forward end thereof is a gear wheel 46c which meshes with internal gear teeth on a film speed or film sensitivity ring 48 which surrounds the forward end of the ring 18b and is rotatable to a limited extent with respect to the ring 18b. The film sensitivity ring 48 carries an index mark or reference point 48a used in connection with the film speed or film sensitivity scale 18e on the ring 18b.

The ring 48 is releasably coupled to the ring 18b by conventional coupling means commonly used for coupling rings of this character, the coupling being released by radially inward pressure on the finger plunger 48b (FIG. 2) so that while inward pressure on this plunger is maintained, the ring 48 can be turned relative to the ring 18b. When the inward radial pressure is released, the coupling is effective so that when the ring 48 turns, the ring 18b turns with it. As above stated, couplings of this kind are well known in the art, an example of such a coupling being shown in FIGS. 4 and 5 of Gebele Patent 3,044,376, granted July 17, 1962.

Associated with the exposure meter indicator or pointer 44b is a scanning device or feeler device comprising a detector lever 50 pivotally mounted on the fixed pivot 10d in the camera body, and having two arms at an angle to each other somewhat in the fashion of a bellcrank lever. A spring 52 tends to turn the lever 50 in a clockwise direction when viewed from the front as in FIG. 1, thereby tending to move the first or upper arm of the lever 50 downwardly to bring the stepped cam portion 50a on the lower edge of the first arm down onto the pointer 44b of the exposure meter, flexing the pointer slightly downwardly into contact with the clamping jaw 10c. The extent of the downward stroke of this first arm of the feeler member 50 will depend on the position of the pointer 44b, which will stop the downward movement of the member 50 earlier when the pointer 44b is farther to the left, and later when the pointer is farther to the right, as will be understood from FIG. 1.

The second or lower arm of the member 50 has a slot 50b which accommodates the pin 26a of the setting ring 26. As the bellcrank lever 50 swings downwardly under the influence of the spring 52, it will thus turn the setting ring 26 in a counterclockwise direction to a variable extent depending upon the position of the pointer 44b of the exposure meter.

The lever 50 also has a pin 50c which overlies a shoulder or projection 54a on the lease slide or plunger 54 which is mounted for vertical movement in the camera 10 but held against rotation therein. The plunger 54 also has a second shoulder 54b, faced downwardly and positioned to engage the shutter trigger or trip 57 during the downward movement of the plunger 54, to cause the shutter to perform its cycle of operation. A return spring 56 tends to move the plunger 54 upwardly, this spring 56 being somewhat stronger than the spring 52 so that the upward pressure of the spring 56 on the plunger 54, transmitted through the shoulder 54a and pin 50c, will swing the lever 50 upwardly or counterclockwise to its limit position, overcoming the force of the spring 52. When the release plunger 54 is moved downwardly by the operator of the camera, however, then the member 50 may swing clockwise under the influence of the spring 52, to the extent permitted by the position of the pointer 44b of the exposure meter.

There is a locking device which prevents the release plunger 54 from being depressed to initiate an exposure, when one or the other of the setting rings 34 and 18b is in an inappropriate position for the kind of exposure desired. This locking device comprises a first locking lever 58 and second locking lever 60 (FIGS. 3 and 4) both pivotally mounted coaxially on the fixed pin 10e secured to the wall 10a of the camera. A spring 58a associated with the locking lever 58 tends to turn it in a clockwise direction when viewed from the front as in FIG. 3, to hold the pin 58b', secured to the first arm 58b of the lever, against the peripheral surface of the locking ring 38. The second arm 58c of this locking lever is in the form of a hook arranged to cooperate with the shoulder 54b of the plunger 54.

The second locking lever 60 has a spring 60a which tends to turn the lever in a clockwise direction to hold the pin 60b', secured to the first arm 60b of this lever, against the peripheral surface of the switch ring 32. The pin 60b' has a recess 60b'' through part of its length, in the plane of the locking ring 38, so that this locking ring will not prevent the pin from dropping into a notch in the periphery of the switch ring 32 at an appropriate time. The second arm 60c of the locking lever 60 is in the form of a hook like that on the locking lever 58, and likewise cooperates with the shoulder 54b on the release plunger 54.

It has already been briefly mentioned that the shutter is provided with delay mechanism or retarding mechanism to determine the length of the exposure. Such mechanism is best seen in FIGS. 7 and 8, to which reference is now made. A stationary pin 62 is fixed to the radial flange or mounting plate portion of the shutter part 12b, and extends forwardly therefrom, parallel to the optical axis. This pin 62 is the mounting pin on which is pivoted a delay mechanism setting plate 64. Pivoted at 64a to this plate 64 is a transmission member 66 having a lug 66b which cooperates with the main driving member or master member 68 of the shutter, and a setting nose 66c which cooperates with the setting pin 70a of the primary member 70 of the delay mechanism or retarding mechanism. This primary member 70 is mounted for oscillation on a fixed pivot on the shutter part 12a, and has gear teeth meshing with the first gear in the usual gear train such as commonly used in a shutter retarding mechanism. For example, the gear teeth of the primary member 70 mesh with the teeth of a pinion 74 which is fixed to a larger gear 76, the teeth of which mesh with further elements of the gear train, for example with a pinion which drives a flywheel of large mass. A spring 72 urges the transmission member 66 in a counterclockwise direction on its pivot 64a, thereby keeping the nose 66c engaged with the setting pin 70a of the primary member 70.

At the other end of the setting plate 64, remote from the pivot 64a, is a lug or pin 64b which engages in a slot 78a of an intermediate lever or arm 78 fixed to a shaft 80 which is rotatably mounted in the shutter housing 12 and extends rearwardly to the rear side of the shutter housing, as seen in FIG. 8. A second intermediate lever or arm 82 is fixed to the rear end of the shaft 80 and carries a setting pin 82a fixed to it, for engagement with the control surface or cam 26b of the setting ring 26. This engagement is insured by a torsion spring 84 (FIG. 7) which urges the arm 78 (and therefore also the shaft 80 and arm 82) in a counterclockwise direction when viewed as in FIG. 7, thereby urging the setting plate 64 in a clockwise direction on its pivot 62, to such extent as is permitted by the engagement of the pin 82a with the cam portion or control portion 26b of the setting ring 26.

The above mentioned master member or main operating member 68 which serves to open and close the shutter blades, is of conventional construction well known in the art, so that the details of the master member itself, and its driving spring, and the mechanism by which the rotation of the master member serves to open and close the shutter blades, need not be shown in detail. Those desiring further information may see, for example, United States Patent 3,089,401, granted May 14, 1963, for an invention of Gebele and Singer, which patent shows further details of a master member and also further details, not necessary to disclose here, of a gear train for delaying or retarding the exposure so as to obtain the desired length or time of exposure. The prior patent also shows how the master member 10 in that patent cooperates with the lug 24a on the transmission lever 24 which in turn causes movement of the retarding or delay mechanism, in a manner quite similar to the way in which the master member 68 in the present application cooperates with the lug 66b on the transmission lever 66 to cause movement of the delay or retarding gear train. The manner in which the rotation of a master member causes the opening and closing movements of the shutter blades is, of course, very well known in the art and the details are not important for purposes of the present invention, as they may be varied widely without affecting other features of the present construction. Merely as one example of suitable mechanism for opening and closing the shutter blades from rotary movement of the master member, reference may be made to United States Patent 3,122,078, granted Feb. 25, 1964, for an invention of Singer.

The present construction enables exposures to be made in various different ways. Thus the present camera and shutter may be set for producing a "programmed" exposure, as explained in detail below under the heading "Setting Example I," or for producing an "automatic" exposure, as explained in detail under the heading "Setting Example II," or for producing a manually controlled exposure, as explained in detail under the heading "Setting Example III." As here used, the term "programmed" exposure means an exposure wherein both the time or speed of exposure and the diaphragm aperture are set automatically under the control of the exposure meter.

The term "automatic" exposure means an exposure in which the diaphragm aperture is set automatically under the control of the exposure meter, but not the time or speed of exposure, the time or speed being set manually. The term "manual" exposure means, of course, an exposure in which both the diaphragm aperture and the time or speed are set manually.

*Setting Example I.—Programmed exposure*

When it is desired to have a programmed exposure, wherein both the shutter speed and the diaphragm aperture are set under the control of the exposure meter or light meter, the user must adjust the manual setting ring 34 so that the index P marked on this ring is brought opposite the reference point 10f on the camera body. This is the position shown in FIG. 2, and is the limit position of the ring 34 when turned in a clockwise direction, viewed from the front. Assuming that the ring 34 may have been previously set to some other position, with the index A or one of the numbers of the diaphragm aperture scale 34c opposite the reference point 10f, the knurled or serrated gripping part of the ring is gripped by the fingers of the user and the ring is turned clockwise until the index P is at the desired location opposite the reference point 10f. This brings the cam portion 32a (FIG. 3) of the switch ring 32 opposite the pin 28c' of the transmission lever 28, since it will be remembered that the switch ring 32 is constantly coupled to the external manual ring 34 by means of the coupling 32o, to turn therewith. This is the position of the parts shown in FIG. 3.

During the rotation of the ring 34 in a clockwise direction to the P position, the shoulder 34a' on the ring 34 engages the lug 18f on the ring 18b and moves the latter likewise in a clockwise direction to its limit position in this direction, wherein the index mark P on the ring 18b is likewise alined with the reference point 10f on the camera body. If the film sensitivity or film speed adjustment has not already been made, it is now made by depressing the release plunger 48b radially inwardly, enabling the manual ring 48 to be turned relative to the ring 18b until the reference mark 48a on the ring 48 is brought opposite the proper graduation of the film speed scale 18e on the ring 18b. FIG. 2 illustrates the parts set for a film speed or sensitivity of "18" on the scale 18e graduated according to the European or DIN values. As the ring 48 is turned, it turns the gear wheel 46c and shaft 46b, thereby turning the entire casing or housing 44 of the exposure meter coil, to vary the position of the meter pointer 44b (for any given amount of light falling on the photocell) in accordance with the film speed or sensitivity.

Before making the exposure, the lens of the camera is focused by turning the focusing ring 16 to bring the desired value of the focus distance scale opposite the index mark. If the film has been fed forward to bring a fresh frame of film into the exposure area, and if, in conjunction therewith, the shutter has been cocked or tensioned in the manner well known to those skilled in the art, all of the preparatory procedures for the exposure have now been completed and the camera is ready to take the photograph. When the camera is pointed toward the photographic subject, the light reflected from the subject falls on the photocell behind the window 10b, thereby moving the coil 44a and the pointer 44b of the exposure meter to a position corresponding to the measured brightness of the subject to be photographed.

The user now presses downwardly on the release plunger or slide 54, to initiate the operation of the camera through its picture-taking cycle. As the plunger moves downwardly against the force of its return spring 56, the downward motion of the shoulder 54a relieves the upward pressure on the pin 50c of the feeler lever 50, thus allowing the feeler lever to swing in a clockwise direction on its pivot 10d, under the influence of its spring 52, until the upper arm of the feeler lever comes into contact with the exposure meter pointer 44b and flexes or depresses the pointer slightly downwardly into contact with the clamping surface 10c, after which the feeler lever 50 can turn no further.

During the downward rocking movement of the lever 50, clockwise from the initial starting position shown in FIG. 1, the action of the feeler lever on the pin 26a of the setting ring 26 turns the setting ring in a counterclockwise direction to an extent depending upon the position of the meter pointer 44b, which in turn depends partly upon the brightness of light from the subject being photographed, and partly upon the film sensitivity setting. As the setting ring 26 turns in a counterclockwise direction (under the influence of the spring 52) it carries the pivot 28a of the transmission lever 28 along with it. The transmission lever 28 moves bodily with its mounting pivot, but does not turn at this time, because at this time the pin 28c' of the transmission lever is riding on a cam portion 32a of the switch ring 32, which cam portion is concentric with the axis of rotation of the ring 26 and has no rise. However, the bodily movement of the transmission lever 28 along with the counterclockwise movement of the ring 26 causes a corresponding counterclockwise movement of the pin 24c which is embraced by the transmission lever 28, and this causes a corresponding counterclockwise movement of the diaphragm control ring 24, thereby changing the aperture of the iris diaphragm.

Simultaneously with the adjustment of the diaphragm aperture as above described, the shutter speed or time of exposure is also being adjusted. The cam portion 26b on the ring 26 moves circumferentially relative to the pin 82a which rides on it, thereby swinging the arm 82 and turning the shaft 80 (FIG. 8) so that the other arm 78 on the shaft turns the setting plate 64 (FIG. 7) of the retarding mechanism to change the extent to which the lug 66b on the transmission member 66 intercepts the path of travel of the master member 68, thereby offering a longer or shorter delay resistance to the running down movement of the master member. The swinging of the setting plate 64 not only moves the lug 66b of the transmission member 66 relative to the master member, but also may move the opposite end 66c of the transmission member in a direction circumferentially of the shutter, but the opposite end always remains in contact with the pin 70a.

In the "programmed" type of exposure now under discussion, an increase in shutter speed is associated with a decrease in the size of the diaphragm aperture. For example, at one end of the range, the slowest shutter speed of 30 may be used with the largest diaphragm aperture of 2.8, and so on, by progressive steps, to the fastest shutter speed of 500 and the smallest aperture of 22. This kind of operation is known in the art and is described, for example (but without calling it a "programmed" operation) in Gebele and Singer Patent 3,065,683, granted Nov. 27, 1962, at column 4, lines 25–38, and in Gebele and Singer Patent 3,095,790, granted July 2, 1963, at column 7, lines 1–11.

FIGS. 3 and 7 of the present drawings show the parts in the initial starting position, with the shutter set for a P exposure, before the plunger 54 is depressed. The setting ring 26 is in a position to hold the pin 82a at maximum distance outwardly from the optical axis, to swing the setting plate 64 to maximum extent in a counterclockwise direction on its pivot 62, thus interposing the lug 66b to maximum extent into the path of running down movement of the master member, to give the longest or slowest exposure, and with the diaphragm control ring 24 in its extreme clockwise position, corresponding to maximum size of opening of the diaphragm aperture. If the light falling on the photocell of the exposure meter is relatively dim, and if the film sensitivity is relatively low, the meter pointer 44b will be at or near the left end of its range of travel, so that when the plunger 54 is depressed, the feeler lever 50 can move only to a slight extent, thus the parts will still be set for a relatively slow shutter speed and a relatively large diaphragm aperture. If the light falling on the photocell increases, or if the film sensitivity adjustment is changed to a higher value of sensitivity or film speed, the meter pointer 44b will move farther to the right, so that upon subsequent depression of the plunger 54, the feeler lever 50 can swing downwardly to a greater extent, thereby turning the ring 26 counterclockwise to a greater extent, and turning the ring 24 counterclockwise with it, which moves the diaphragm to a smaller aperture and allows the pin 82a to ride down the slope of the cam 26b to produce a faster shutter speed.

As the release plunger 54 is depressed, the shoulder 54a moves downwardly, leaving the feeler lever 50 behind in whatever position it is stopped by the pointer 44b. The final part of the downward movement of the plunger 54 operates the shutter trip or trigger 57, unlatching the master member 68 so that it performs its conventional running down movement in a clockwise direction under the action of its usual driving spring (not shown). During the first part of the running down movement, the shutter blades are opened. The master member cannot complete its running down movement to close the blades, however, until it displaces the lug 66b of the transmission member 66, if this lug is in the path of travel of the master member. Therefore (except when the shutter is set for its highest speed) the running down movement of the master member is delayed or impeded by the necessity of thrusting the lug 66b aside, which can be done only by turning the transmission member 66 in a counterclockwise direction on its pivot 64a, causing the end 66c of the transmission member to press against and displace the pin 70a of the primary member 70 of the retarding mechanism, to swing the primary member and operate the retarding gear train in the manner familiar in the art.

Near the end of the running down movement of the master member 68, the shutter blades are closed in the familiar manner well understood in the art. When the master member reaches its completely run down or rest position, the peripheral surface 68a of the master member is still engaged with the lug 66b of the transmission member 66, thereby preventing the transmission member and the subsequent parts of the retarding mechanism engaged with it, from returning to their starting position until the shutter is again cocked.

At the conclusion of the exposure, when the manual pressure on the plunger 54 is released, the restoring spring 56 raises the plunger to its initial position and restores the feeler lever 50 and the setting ring 26 to their initial positions. The restoring movement of the setting ring 26 also restores the diaphragm aperture control ring to its starting position, and the cam 26b on the ring 26 operates on the pin 82a so that, through the shaft 80 and arm 78, the setting plate 64 is also restored to its initial or starting position. Thus these parts just mentioned resume the positions shown in FIG. 7. In contrast to this, however, the parts 66, 70, 74, and 76 of the retarding mechanism do not assume the positions illustrated in FIG. 7 until the shutter is again tensioned or cocked, whereupon the lug 66b is released so that the usual return spring of the delay or retarding mechanism (not shown here, but well known in the art and similar, for example, to the restoring spring 22b in Gebele Patent 3,089,401) can then restore the retarding gear train and the transmission lever 66 to their initial starting positions.

*Setting Example II.—Automatic exposure*

There are certain situations where the operator wishes to pre-select the shutter speed or duration of exposure, and to have the mechanism of the camera automatically select only the diaphragm aperture; for example, when one wishes an exposure at a fast shutter speed in order to photograph clearly a moving object, or when one wishes a relatively slow shutter speed so as to have a relatively small diaphragm aperture with consequent increase in the depth of field.

For producing an automatic exposure, the manual setting ring 34 must be turned to bring the mark A on this ring opposite the reference point 10f. If the camera has previously been set for a programmed exposure, this will involve a counterclockwise rotation of the ring, when viewed from the front. During the first part of this counterclockwise rotation, the shoulder 34a' (FIG. 3) on the ring 34 will be moved away from the lug 18f on the ring 18. The switch ring 32 is carried along by the movement of the external manual ring 34, because of the coupling 32o between these two rings. The counterclockwise movement removes the cam portion 32a on the ring 32 from the vicinity of the pin 28c' on the transmission lever 28, and brings the second cam portion 32b into cooperative relation to the pin 28c'. While the movement is taking place, the pin 28c' must ride up the short transition cam 32b', which causes a temporary movement of the diaphragm control ring 24, but by the time the movement of the ring 34 from the P position to the A position has been completed, the pin 28c' has moved down the slope of the cam 32b to the flat part thereof and the transmission lever 28 is once more in the same initial or starting position as shown in FIG. 3, although now it is the cam 32b which is operative on the transmission lever, rather than the cam 32a.

Also during the counterclockwise shifting of the ring 34, the tooth 36a of the leaf spring 36 (FIG. 7) engages the free end of the leaf spring 20 on the shutter speed ring 18b and carries the ring 18b around a short distance, moving it from its P position to its next position where the longest shutter speed graduation (1/30 of a second) is brought opposite the index mark 10f. Then as the rotation of the ring 34 continues, the tooth 36a on the spring 36 drops into the recess 12d in the shutter housing, breaking the connection between the rings 34 and 18b, so that the ring 18b is now free to be turned to any other desired shutter speed setting. During this movement of the ring 18b from its P position to the first shutter speed position 1/30, the speed control ring 18 has made a corresponding movement, with the result that the control step 18c' thereon slides to a slight extent along the setting pin 70a of the retarding mechanism, but without causing any angular movement of the primary member 70 of the retarding mechanism, since this first step 18c' on the ring 18 is long enough to be engaged by the pin 70a both when the ring is in the P position and when it is in the 1/30 position.

It is only when there is to be a manual time setting at a higher speed than 1/30 second that the setting pin 70a makes engagement with one of the other steps 18c of the time cam 18, to turn the primary member 70 in a counterclockwise direction. This setting movement of the primary member 70 can be followed by the transmission member 66, under the action of its spring 72, so that as a result, there is a corresponding lessening of the extent to which the lug 66b impedes the running down movement of the master member, thus providing less retarding and faster exposure.

Also, when the switch ring 32 is moved from P position to A position, the cam 32g (FIG. 3) engages the pin 82a and guides the pin into the slot 32f. In the A position of the rings 32 and 34, the pin 82a is retained in the slot 32f so that the control of the speed of exposure is by means of the action of the cam ring 18 on the pin 70a of the primary member 70, rather than by the action of the cam 26b on the pin 82a and member 64. The same is true when rings 34 and 32 are swung further in a counterclockwise direction, for manual setting of the diaphragm aperture rather than automatic setting thereof.

During the switching movement of the parts from position P to position A the locking devices 58 and 60 come into operation and prevent depression of the release plunger 54 if the switching movements are not fully performed to the proper positions. At the beginning of the switching movement of the switch ring 32, the pin 60b' (FIG. 3) of the latching lever 60 drops into the recess 32k on the periphery of the switch ring, so the spring 60a turns the locking lever slightly in a clockwise direction, bringing the hooked end thereof beneath the lug 54b. Also, the lug 32h of the switch ring 32 moves away from the pin 58b' of the other latching or locking lever 58, so this pin can drop into the recess 38a of the locking ring 38, and the spring 58a can turn the lever 58 to bring its hooked end also under the lug 54b of the plunger 54. Thus both of the levers 58 and 60 are effective to prevent depression of the plunger at any intermediate stage of the switching operation. At the end of the switching operation, the pin 60b' rides up from the recess 32k to a higher part of the periphery of the ring 32, moving the lever 60 to an unlocked position. Also the turning movement of the locking ring 38 (coupled to and turning with the ring 18b) when the ring 18b is moved from P position to the 1/30 shutter speed position serves to move the pin 58b' out of the notch 38a to a higher part of the periphery of the ring 38, thereby moving the other locking lever 58 to a released position. Thus when the ring 34 is properly moved to A position and when the ring 18b is properly moved from P position to any one of the definite shutter speed positions, the two locking levers 58 and 60, which were temporarily effective during the shifting movement, become ineffective and do not interfere with the camera release 54.

All of the preparatory setting procedures having now been performed (in much less time than it takes to describe them) the camera is pointed toward the scene to be photographed, and the release plunger 54 is manually depressed to initiate the exposure. The exposure meter works in the same manner as already described in connection with a programmed exposure (Example I, above) and in the same way controls the extent to which the feeler member 50 will swing downwardly. This downward swinging of the feeler member 50 carries the setting ring 26 around in a counterclockwise direction, as before, to a variable extent depending upon the brightness of light falling upon the photocell of the exposure meter, and upon the film sensitivity setting. As before, the counterclockwise turning of the ring 26 carries the pivot 28a of the transmission lever 28 with it, moving the transmission lever bodily, similar to the motion during a programmed exposure, but with the difference that the pin 28c' of the transmission lever 28 now rides on a cam portion 32b which has a rise to it, rather than on the cam portion 32a which has no rise. Thus the diaphragm aperture control ring 24 is adjusted according to the combined effect of the bodily movement of the transmission lever 28 and also the swinging or turning movement of this lever in a clockwise direction on its pivot 28a, because of the rise of the cam 32b. The combined effect of both movements together serves to adjust the diaphragm to the desired aperture.

Just as in the previously described programmed exposure, the further downward movement of the release member 54, after completion of the movement of the setting ring 26, serves to operate the shutter trigger 57 to release the master member 68 for rotation to open and close the shutter blades to make the actual exposure.

As above mentioned when describing the action of the spring fingers 36 and 20, the shifting of the ring 34 from P position to A position will move the shutter speed ring 18b from P to the first numerical shutter speed value position, which in the present preferred construction is 1/30 of a second. However, if the operator desires a different shutter speed, he turns the ring 18b (by grasping the serrated ring 48 which is coupled to the ring 18b) and turns the ring to bring any desired shutter speed of the scale 18d opposite the index point 10f. This turning movement of the coupled rings 48, 18b will serve, through the shaft 46b, to turn the entire exposure meter housing 44, to feed into the exposure meter mechanism the factor of shutter speed, so that the automatic diaphragm aperture control under the influence of the meter will also be influenced by the shutter speed which has been set.

*Setting Example III.—Manually controlled exposure*

If it is desired to control both the shutter speed and the diaphragm aperture manually, the serrated gripping ring 34 is turned counterclockwise beyond the A position to bring any desired one of the diaphragm aperture graduations on the scale 34c opposite the reference point 10f. In any such position of the ring 34, the rings 18b and 48 are freely adjustable by hand within the limits of the shutter speed scale range, so any desired one of the shutter speed indications on the scale 18d may be brought opposite the reference mark 10f.

When the ring 34 is in the A position, the pin 40a' (FIG. 3) of the locking lever 40 is approximately at the right hand end or clockwise end of the cam 32d of the switch ring 32. Therefore, as soon as the rings 34 and 32 are turned counterclockwise from the A position, the pin 40a' will ride down the inclined cam 32e, so that the spring 42 can turn the locking lever 40 to bring the hooked nose 40b thereof in front of the pin 26a on the setting ring 26. The feeler lever 50 engages this same pin 26a and normally holds it (between exposures) against a fixed abutment or stop 10x. Thus the counterclockwise rotation of the rings 32 and 34 (beyond the A position) operates the lever 40 to lock the pin 26a and the setting ring 26 in a predetermined basic position.

After a small amount of counterclockwise rotation of the rings 34 and 32 beyond the A position, sufficient to bring the first graduation of the diaphragm aperture scale 34c opposite the reference point 10f, the pin 28c' on the transmission lever 28 is at the junction between the cam surface 32b and the cam surface 32c. The diaphragm is fully open to its largest aperture. Any further rotation of the rings 34 and 32 in the same counterclockwise direction, to set the diaphragm for a smaller aperture (bringing a larger f number opposite the reference point 10f) will cause the pin 28c' of the transmission lever 28 to ride up the inclined cam 32c, thus swinging the transmission lever 28 on its pivot 28a and causing turning of the diaphragm control ring 24, to close down the diaphragm leaves to the desired aperture.

During the movement of the rings 34 and 32 from A position to the first one of the specific diaphragm aperture positions, the notch 32m in the periphery of the ring 32 comes opposite the pin 60b' of the locking lever 60, so that the spring 60a of the lever moves it to locking position with respect to the release plunger 54. Thus if the ring 34 is moved part way but not all the way from the A position to the first of the manual diaphragm setting positions, the release plunger of the camera can not be depressed. When the ring is fully moved all the way to the first of the manually set diaphragm positions, the pin 60b' rides up out of the notch 32m to release the locking lever 60.

The manual turning of the ring 48 (and ring 18b with it) to bring any desired shutter speed graduation opposite the reference point 10f, causes the same actions as described above in Example II, relating to automatic exposure. The internal speed control ring 18 turns with the external ring 18b, to bring various different cam portions 18c or 18c' into engagement with the pin 70a of the primary member 70 of the retarding mechanism, to adjust such mechanism for an exposure of the desired speed.

If the release member 54 of the camera is now depressed, the shutter trigger 57 is operated and the exposure is made at the speed and aperture which have been set by hand. The feeler device 50 does not operate at this time, because the locking lever 40 holds the setting ring 26 and pin 26a against movement, which prevents movement of the feeler member 50.

When it is desired to change the camera back from manual setting to programmed setting, the manual setting ring 34 is turned clockwise to bring the graduation P opposite the reference mark 10f. This motion restores the ring 18b also to its P setting position, by means of the engagement of the shoulder 34a' on the ring 34 with the arm 18f on the ring 18b. During this clockwise turning of the ring 34, just as the graduation A thereon comes opposite the reference point 10f, the cam 32e on the ring 32 engages the pin 40a' on the locking lever 40 and moves this lever to an unlocked position, no longer preventing movements of the setting ring 26 in response to movements of the feeler 50. The locking lever 40 remains in this unlocked condition as the clockwise turning of the ring 34 continues from A to P position.

Also during this clockwise rotation of the rings 34 and 32, the setting pin 82a is freed from the slot 32f so that this pin can again engage the time control cam 26b on the ring 26, under the influence of the spring 84. Moreover, the rotation of the rings 34 and 32 carries the cam portions 32c and 32b away from the pin 28c' on the transmission lever 28, and brings the cam portion 32a into cooperative relation to this pin 28c'.

For correct operation in making a programmed exposure, the parts previously set for a different type of exposure should be restored to P position by manually rotating the ring 34, which will automatically rotate the ring 18b back to its P position at the same time, on account of the engagement of the shoulder 34a' of the ring 34 with the lug 18f on the ring 18b. However, it may happen, due to oversight, that the user grasps the ring 48 instead of the ring 34 and turns it to its P position without turning the ring 34. Even though the graduation P on the ring 18b is opposite the reference point 10f, a programmed exposure can not be made if the ring 34 is not also in its P position. If the ring 34 is accidentally left in some other position when the ring 18b is moved to P position, faulty operation is prevented by the locking lever 58. When the ring 18b is in its P position, the notch 38a in the periphery of the locking ring 38 (coupled to the ring 18b to turn therewith) is opposite the pin 58b' on the locking lever 58. Unless the ring 34 is also in its P position, the pin can drop into this notch 38a, allowing the spring of the locking lever 58 to swing the lever to locking position with respect to the release plunger 54. Thus it will be brought to the attention of the user, when he attempts to depress the release plunger 54, that the parts are not properly set for operation. But when the ring 34 is also brought to its P position, the lug 32h on the switch ring 32 (coupled to the ring 34) comes to a position opposite the notch 38a and raises the pin 58b' from the notch 38a, moving the locking lever 58 from locked position to ineffective position.

In the course of the clockwise restoring movement of the ring 34 to its P position from some other position in which it may have been previously set, the tooth 36a on the leaf spring 36 moves out of the recess 12d in the shutter casing, and presses the leaf spring 20 radially outwardly to bring it into the path of the periphery of the shutter casing.

The camera preferably includes a viewfinder, indicated schematically in FIG. 1 at 10g. If desired, the indication given by the movable pointer of the exposure meter, and the indication of diaphragm aperture setting, can both be reflected into and be visible in the viewfinder, by known means well understood in the art, so that the person looking through the viewfinder will be given an indication or signal that the setting system is ready for operation and that the illumination conditions are within the acceptable range.

From the preceding description it will be noted that the preferred form of construction includes a single transmission lever 28 which is used to operate the diaphragm aperture control ring in accordance with various programs or setting systems which can be selected at will. Thus the transmission lever includes a first part (the arm 28b) which is constructed as a driver or operating member for the diaphragm aperture control ring 24. It is connected at a second part (at the pivot 28a) with a control ring 26 which can be operated, when desired, in accordance with the indications or measurements of an exposure meter. The transmission lever 28 also has a third part (the arm 28c) which is in engagement with a control cam of a manually adjustable switch ring 32. This cam has one zone 32a with no rise, along which the arm 28c of the transmission lever may slide without causing any rotation of the transmission lever. The cam also has at least one other zone or portion (32b or 32c) which does have a rise or inclination, so that relative circumferential movement between the transmission lever and this other zone of the cam will cause a turning movement of the transmission lever on its pivot. This arrangement in accordance with the present invention has the advantage that it is very simple to use, and is of simple construction and economical of parts.

A further advantage of the construction herein disclosed is seen in the fact that driving members (18f, 34a', and 36a) are provided between the setting members 34 and 18d, for the diaphragm aperture and shutter speed, respectively, and these driving members are effective in both directions. In other words, when the setting member 34 is turned in a clockwise direction to a certain position, the cooperating driving members 34a' and 18f will turn the other setting member 18b to a corresponding position; and when the setting member 34 is turned to a certain extent in the opposite or counterclockwise direction, the driving member 36a will drive the ring 18b correspondingly to a certain position. Another special advantage of the present construction is that the locking members 58 and 60 are operatively interposed between the rotatable setting members 34 and 18b on the one hand, and the camera release member 54 on the other hand, serving to lock the operation of the release member 54 when either or both of the settable members 34 and 18b are in certain incorrect positions.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising an adjustable diaphragm, a first control member movable to vary the aperture of the diaphragm, exposure meter means, a second control member movable in accordance with measurements recorded by said exposure meter means, said first control member being moved by movement of said second control member when adjusting said diaghragm in accordance with said exposure meter means, and a manually adjustable switch member having a control cam moved thereby, characterized by the fact that there is a transmission member having a first part connected in driving relation to said first control member during all exposure operations of all kinds, a second part operatively connected to said second control member, and a third part operatively engaged with said control cam on said switch member, said control cam having one cam zone with no rise for engaging said third part of said transmission member when said manually adjustable switch member is set for exposure operations of one kind and having at least one other cam zone with an inclination for engaging said third part of said transmission member when said manually adjustable switch member is set for exposure operations of a different kind.

2. A construction as defined in claim 1, wherein said manually adjustable switch member is in the form of a rotary ring and wherein said control cam on said switch member has one zone concentric with the axis of rotation of said switch member and merging into two further cam zones having different opposed radial rises.

3. A construction as defined in claim 1, further characterized by the fact that said transmission member is in the form of a two-armed lever having a pivot intermediate its ends, and by the fact that it is pivotally mounted on and movable bodily with said second control member and has a first arm connected to said first control member and a second arm for engaging said control cam.

4. A construction as defined in claim 3, wherein said first control member, said second control member, and said switch member are all in the form of rings mounted for rotary movement coaxially with each other and with the optical axis of the camera.

5. A photographic camera comprising an adjustable diaphragm, a first control member movable to vary the aperture of the diaphragm, exposure meter means, a second control member movable in accordance with measurements recorded by said exposure meter means, and a manually adjustable switch member having a control cam moved thereby, characterized by the fact that there is a transmission member having a first part connected in driving relation to said first control member, a second part operatively connected to said second control member, and a third part operatively engaged with said control cam on said switch member, said control cam having one cam zone with no rise for engaging said third part of said transmission member when said manually adjustable switch member is set for exposure operations of one kind and having at least one other cam zone with an inclination for engaging said third part of said transmission member when said manually adjustable switch member is set for exposure operations of a different kind, further characterized by the fact that said transmission member is in the form of a two-armed lever having a pivot intermediate its ends, and by the fact that it is pivotally mounted on and movable bodily with said second control member and has a first arm connected to said first control member and a second arm for engaging said control cam, said first control member, said second control member, and said switch member all being in the form of rings mounted for rotary movement coaxially with each other and with the optical axis of the camera, and further including exposure speed regulating means having a setting pin for adjusting the same, characterized by the fact that the ring which constitutes said second control member has a control cam which acts upon said setting pin during engagement of said transmission member with said no rise cam zone of said switch member.

6. A photographic camera comprising exposure meter means, exposure time regulating means including a first setting pin and a second setting pin, a control member movable in accordance with measurements recorded by said exposure meter means, said control member having a cam for coacting with said first setting pin when exposure time is to be regulated in accordance with said exposure meter means, an exposure time setting ring rotatable to a first position when exposure time is to be regulated in accordance with said exposure meter means and rotatable to any one of a plurality of other positions within a range of positions when exposure time is to be regulated manually and not in accordance with said exposure meter means, said time setting ring having a cam for coacting with said second setting pin, a manually rotatable switch ring rotatable to a first position when exposure time is to be regulated in accordance with said exposure meter means and rotatable to a plurality of other effective positions when exposure time is not to be regulated in accordance with said exposure meter means, and means for turning said time setting ring to its first position by the act of turning said switch ring to its first position.

7. A construction as defined in claim 6, wherein said last named means includes an abutment shoulder on said switch ring and a part engaged thereby on said time setting ring.

8. A photographic camera comprising exposure meter means, exposure time regulating means including a first setting pin and a second setting pin, a control member movable in accordance with measurements recorded by said exposure meter means, said control member having a cam for coacting with said first setting pin when exposure time is to be regulated in accordance with said exposure meter means, an exposure time setting ring rotatable to a first position when exposure time is to be regulated in accordance with said exposure meter means and rotatable to any one of a plurality of other positions within a range of positions when exposure time is to be regulated manually and not in accordance with said exposure meter means, said time setting ring having a cam for coacting with said second setting pin, a manually rotatable switch ring rotatable to a first position when exposure time is to be regulated in accordance with said exposure meter means and rotatable to a plurality of other effective positions when exposure time is not to be regulated in accordance with said exposure meter means, and means operated by turning said switch ring from its first position to one of its other positions for rendering said cam on said control member ineffective with respect to said first setting pin and for turning said time setting ring from its first position to one of its other positions within its said range.

9. A construction as defined in claim 6, further including a camera release member movable to initiate an exposure operation, and means controlled by said switch ring for locking said release member when said switch ring is in an intermediate position between its first position and nearest effective one of its said plurality of other effective positions.

10. A construction as defined in claim 6, further including a camera release member movable to initiate an exposure operation, and means controlled jointly by said switch ring and said time setting ring for locking said release member when said time setting ring is in its first position unless said switch ring is also in its first position.

11. A construction as defined in claim 6, further including means operated by turning said exposure time setting ring for changing the effective measurement recorded by said exposure meter means.

12. A construction as defined in claim 6, wherein said exposure meter means includes a bodily rotatable meter housing, said construction further comprising a film sensitivity setting ring mounted coaxially with said time setting ring to turn bodily therewith and also to turn relatively to said time setting ring to a plurality of film sensitivity adjustment positions, and gearing operatively connecting said film sensitivity setting ring to said meter housing to turn said meter housing by rotation of said film sensitivity setting ring, thereby to change the effective measurement recorded by said exposure meter means.

13. A photographic camera comprising exposure meter means, exposure time regulating means including a first setting pin and a second setting pin, a control member movable in accordance with measurements recorded by said exposure meter means, said control member having a cam for coacting with said first setting pin when exposure time is to be regulated in accordance with said exposure meter means, an exposure time setting ring rotatable to a first position when exposure time is to be regulated in accordance with said exposure meter means and rotatable to any one of a plurality of other positions within a range of positions when exposure time is to be regulated manually and not in accordance with said exposure meter means, said time setting ring having a cam for coacting with said second setting pin, a manually rotatable switch ring rotatable to a first position when exposure time is to be regulated in accordance with said exposure meter means and rotatable to a plurality of other effective positions when exposure time is not to be regulated in accordance wth said exposure meter means, means operated by turning said switch ring from its first position to one of its other positions for rendering said cam on said control member ineffective with respect to said first setting pin and for turning said time setting ring from its first position to one of its other positions within its said range, and means operated by further turning of said switch ring from one of its other positions to another one of its other positions for locking said control member stationary in a basic position.

References Cited by the Examiner
UNITED STATES PATENTS

| | | | |
|---|---|---|---|
| 3,037,437 | 6/1962 | Rentschler | 95—10 |
| 3,071,053 | 1/1963 | Rentschler | 95—10 |
| 3,117,503 | 1/1964 | Ohara | 95—64 X |
| 3,216,340 | 11/1965 | Henning | 95—10 X |

NORTON ANSHER, *Primary Examiner.*

J. F. PETERS, *Assistant Examiner.*